United States Patent Office 3,076,750
Patented Feb. 5, 1963

3,076,750
MICROBIOLOGICALLY REDUCING KETO ACIDS
Gerard Tuynenburg Muys, Rotterdam, and Bastiaan van der Ven and Aeilko Pieter de Jonge, Vlaardingen, Netherlands, assignors to Lever Brothers Company, New York, N.Y., a corporation of Maine
No Drawing. Filed June 20, 1960, Ser. No. 37,034
Claims priority, application Great Britain July 1, 1959
19 Claims. (Cl. 195—30)

This invention relates to a method for the preparation of optically active compounds and to the new optically active compounds thus obtained.

The present invention provides a new method for the preparation of certain optically active lactones and the corresponding hydroxycarboxylic acids. This method comprises microbiological reduction of ketocarboxylic acids.

These optically active lactones comprise the lactones of gamma-hydroxycarboxylic acids containing 5 to 18, preferably 7 to 14, most preferably 8 to 12 carbon atoms, and of delta-hydroxycarboxylic acids containing 6 to 18, preferably 7 to 14, most preferably 8 to 12 carbon atoms which are prepared from the corresponding gamma- and delta-ketocarboxylic acids of the general formula $$R.CO.(CHR')_n.COOH$$

in which R is a saturated or olefinically unsaturated hydrocarbon radical containing from 1 to 14 carbon atoms, said radical being a straight or branched chain aliphatic radical, R' is hydrogen or a straight or branched chain alkyl group containing from 1 to 5 carbon atoms and $n$ is 2 or 3. Thus R may be for example —$CH_3$,

—$CH_2.CH_3$, —$CH_2.CH_2.CH_3$, —$CH_2.(CH_2)_2.CH_3$

—$CH_2.(CH_2)_3.CH_3$

—$CH.(CH_2)_4.CH_3$, —$CH_2.(CH_2)_5.CH_3$

—$CH_2.(CH_2)_6.CH_3$

—$CH(CH_3).CH_2.CH_3$, —$CH(CH_2.CH_3)_2$

—$CH_2.CH_2.CH(CH_3)_2$

—$CH_2$—$CH$=$CH$—$CH_3$

The preferred optically active lactones obtained according to the present invention are the dextrorotatory lactones.

More specifically the method of preparing these optically active lactones or the corresponding hydroxycarboxylic acids or their esters comprises the microbiological reduction of gama- or delta-ketocarboxylic acids by incorporating ketocarboxylic acids in an aqueous medium containing viable cell material of one or more species of micro-organisms having reductive capacities. (The aqueous medium containing cell material is referred to below simply as medium, as usual in biochemistry.)

The micro-organism may be a micro-fungus, especially a yeast, for example Saccharomyces cerevisiae, Candida dattila, Candida globiformis, Candida monosa, Candida pseudotropicalis, Candida pseudotropicalis var. lactosa, Saccharomyces fragilis and Candida lactis, or a mould, for example Penicillium notatum, Margarinomyces bubaki and Cladosporium butyri. Bacteria, such for example as Sarcina lutea and Escherichia freundi, have also been found useful.

It is generally advantageous to have present in the medium, yeast extract, obtainable by extracting yeast with boiling water.

It is an additional optional, feature of the invention to incorporate an activator in the medium. Although fresh cell material is able to reduce ketocarboxylic acids to the corresponding hydroxycarboxylic acids or their lactones to a certain extent, the yield can be increased appreciably by adding a small percentage (1 to 10% based on the weight of yeast extract) of fermentable sugars.

The ketocarboxylic acids in certain concentrations appear to be toxic towards the micro-organisms, the toxicity apparently increasing with increasing number of carbon atoms in the ketocarboxylic acids and with decreasing pH. Some minimum growth-limit concentrations found for fungi are shown in the Table I.

TABLE I

| Ketocarboxylic acid | Minimum growth-limit concentration in percent at— | | |
|---|---|---|---|
|  | pH=5 | pH=6.5 | pH=7 |
| 4-ketodecanoic acid | 0.05 | 1.5 |  |
| 4-ketododecanoic acid | 0.01 | 0.50 |  |
| 5-ketodecanoic acid | 0.01 |  | 1 |
| 5-ketododecanoic acid | 0.0025 |  | 0.25 |

The toxicity of the corresponding hydroxycarboxylic acids and of the corresponding lactones appears to be even more pronounced.

To avoid toxic effects of the keto acids and their reaction products comparatively large volumes of medium have been found desirable. To avoid using volumes of medium which are excessively large the ketocarboxylic acids may be added gradually to the medium. The gradual addition of the ketocarboxylic acids may be effected mechanically by adding them in small portions either continuously or discontinuously.

The process according to the invention can be carried out discontinuously or continuously.

When the process is carried out discontinuously the reaction time is preferably about 12–48 hours. In reaction times significantly shorter than 12 hours no reasonable yield has been obtained, whereas prolonging the reaction time beyond 48 huors had little effect on the yield.

When the process is carried out continuously a nutrient solution, that is a medium as defined above but without cell material, to which one or more ketocarboxylic acids have been added, can be filtered through a layer of cell material of one or more micro-organisms, exhausted cell material being removed and fresh cell material added either discontinuously or continuously.

The toxicity of the hydroxycarboxylic acids is presumed to inactivate the micro-organisms in the medium. However, the inactivated micro-organisms can be reconstituted, preferably by suspending them in a phosphate buffer solution of pH=6 to 8 containing glucose, for a few hours with aeration. The reconstituted micro-organisms can then be used again or show the same activity as the original fresh micro-organisms. Less effective reconstitution methods are: the process as described above without aeration, and a process consisting in simply suspending the inactivated micro-organisms in a new medium.

The temperature range within which the reduction normally takes place is from 10–40° C., the optimal temperature for most of the micro-organisms being about 30° C.

In order to obtain good yields the pH of the medium is adjusted within the range 4–8, preferably 6–7.

After the addition of the ketocarboxylic acid, owing to the carbon dioxide developed during its reduction the pH drops gradually to 4.5–5.5.

The recovery of the hydroxycarboxylic acid and/or the corresponding lactones obtained can be achieved for example by acidification of the reaction mixture, for example with sulphuric acid, to a pH of about 1–2 after separating the liquid from the cell material by centrifuging.

If desired, the yeast material is suspended in an alkaline medium with a pH of about 11, after which the suspension is centrifuged and filtered, the filter washed with ether, the yeast material discarded and the solution acidified with sulphuric acid to a pH of about 1 to 2.

The combined acidified solutions containing hydroxycarboxylic acids, due to the acidification already partly lactonized, may then be extracted with a solvent, for instance by shaking with 4 times its volume of ether.

The extract is dried, the solvent evaporated and the hydroxycarboxylic acids thus recovered are lactonized by heating, for example under vacuum at 100 to 130° C. for 1 to 3 hours. The crude lactone thus obtained may be purified, for example by dissolving in light petroleum, deacidifying with a base for example triethanolamine (1 g. per 100 g. of crude lactone), removing the solvent by distillation and distilling the pure lactone under vacuum.

The volume of the aqueous liquid obtained after separating from the cell material can also be diminished by making the liquid alkaline (to a pH of 10–11) followed by evaporation of the water to a great extent at a low temperature under vacuum. The residue, after extracting with ether, may be acidified to a pH of 1–2 and subsequently extracted again with ether. The further recovery can be performed as described in the preceding paragraph. This method is advantageous when larger amounts of ketocarboxylic acids are to be reduced.

The products of the invention are useful as fungistatic agents or flavouring substances.

The following examples illustrate the invention:

Examples 1 to 9

These examples describe the preparation of the optically active lactones of gamma- and delta-hydroxycarboxylic acids containing 8 to 12 carbon atoms from the corresponding ketocarboxylic acids.

The reductions were carried out in a medium containing fresh yeast (Saccharomyces cerivisiae), a 10% yeast extract obtained by triturating 200 g. of bakers' yeast in a mortar with 1000 ml. of water adjusting the pH to 6, heating for 20 minutes in an autoclave at 110° C. and filtering, and glucose, in a glass vessel, by keeping the reaction mixture at 30° C. for 24 hours after the addition of the ketocarboxylic acid to the medium.

Subsequently the liquid was separated from the yeast by centrifuging, followed by acidification to pH=1 with sulphuric acid and subsequent extraction with ether of the liquid. The etherial extract was dried, the ether evaporated and the residue heated under vacuum at 130° C. for 1 hour. The crude lactone thus obtained was then purified by dissolving it in light petroleum, deacidifying the solution with triethanolamine, distilling off the light petroleum and finally distilling the lactone under vacuum.

The quantities of the components of the medium (minimum quantities for 1 g. of the acid), the yields obtained and constants (specific rotation and boiling point) for the products are given in the Tables II and III below.

(Part of the yeast can be replaced by an equal quantity of glucose provided that the weight of yeast is at least equal to that of the glucose and yeast plus glucose amounts to at least 10% of the yeast extract.)

TABLE II

| Example | Keto acid (1 g.) | Yeast (g.) | Glucose (g) | Yeast extract (ml.) |
|---|---|---|---|---|
| 1 | 4-ketononanoic acid | 180 | 45 | 1,800 |
| 2 | 4-ketodecanoic acid | 75 | 18.7 | 750 |
| 3 | 4-ketoundecanoic acid | 180 | 45 | 1,800 |
| 4 | 4-ketododecanoic acid | 150 | 37.5 | 1,500 |
| 5 | 5-ketooctanoic acid | 45 | 30 | 600 |
| 6 | 5-ketononanoic acid | 204 | 25.6 | 2,040 |
| 7 | 5-ketodecanoic acid | 40 | 30 | 600 |
| 8 | 5-ketoundecanoic acid | 200 | 26 | 2,000 |
| 9 | 5-ketododecanoic acid | 85 | 21 | 850 |

TABLE III

| Example | Corresponding lactone | | |
|---|---|---|---|
| | Yield in percent | (alpha)$_D$ | B.P. ° C./mm. |
| 1 | 80 | +50.4 | 62.5/0.06 |
| 2 | 85 | +47.2 | 87.5–90/0.15 |
| 3 | 75 | +44.1 | 94/0.1 |
| 4 | 80 | +44.1 | 123–129.5/1 |
| 5 | 60 | +56.9 | 82–87/0.17 |
| 6 | 60 | +58.2 | 76/0.15 |
| 7 | 85 | +55.6 | 103.9/0.2 |
| 8 | 70 | +47.9 | 101/0.15 |
| 9 | 80 | +42.2 | 105/0.05 |

In any of Examples 1 to 9 the acid specified can be replaced by 4-keto- or 5-keto-tetradecanoic, hexadecanoic or octadecanoic acids with a view to obtaining the corresponding optically active lactones.

Examples 10 to 13

These examples illustrate the recovery of the optically active lactones from the medium when greater amounts of keto-acids (10 g. or more) have been reduced.

The reduction of delta-keto carboxylic acids was carried out under the same conditions as described in Examples 1 to 9 except that the volume of the medium was ten times as large the concentrations being the same. At the end of the reduction process the pH of the medium was brought to 7 by adding a 50% solution of potassium hydroxide. After the addition of filter-aid, the yeast cells were centrifuged or filtered off, and subsequently washed with water.

The pH of the filtrate was adjusted to 10–11; about 70–75% of the filtrate was distilled off under reduced pressure (5–20 mm.) at 25–50° C. The residue was extracted with ether and was then acidified to pH 1–2 with 50% sulphuric acid. Subsequently it was extracted with ether. (The extraction can also be carried out with petrol.) The solution obtained was washed with water until free from acid and dried over sodium or magnesium sulphate. After drying the solvent was evaporated.

To promote the lactonisation, the residue was heated under reduced pressure (5–20 mm.) at 130° C. for 1–2 hours using a reflux condenser. The crude lactone was dissolved in petrol in a concentration of 50 g./l. and deacidified by shaking with triethanolamine. (Alternatively similar weakly alkaline substances such as an aqueous solution of triethanolamine borax or sodium bicarbonate can be used.) After washing with water, the petrol was evaporated. The lactone was then distilled off.

In Table IV below, the acid treated is specified in the second column, while the remaining columns show the weight of acid reduced in grams, W, the volume before distillation, $V_1$, and after distillation, $V_2$, both in litres, the temperature of reduction in ° C., T, and the specific rotation in °, alpha$_D$.

TABLE IV

| Example | Acid | W(g.) | $V_1$(l.) | $V_2$(l.) | T(° C.) | (alpha)$_D$(°) |
|---|---|---|---|---|---|---|
| 10 | 5-keto-octanoic | 57 | 53 | 6 | 35 | +54.0 |
| 11 | 5-keto-nonanoic | 10 | 18 | 3 | 50 | +58.2 |
| 12 | 5-keto-decanoic | 200 | 126 | 10 | 35 | +54.5 |
| 13 | 5-keto-dodecanoic | 160 | 174 | 30 | 35 | +42.0 |

The yields of the lactones and the specific rotations were practically the same as in the corresponding examples of the first series, Examples 5 to 9.

In case the final product still smells of yeast, it is allowed to stand some time with defatted copper turnings prior to distillation.

Examples 14 to 23

These examples illustrate the effect of different cultures. The reductions were carried out in a medium containing 15 g. of micro-organism, 12.5 g. of glucose and 250 ml. of yeast extract in a glass vessel by keeping the reaction mixture at 30° C. for 24 hours after the addition of 0.5 g. of 5-keto-decanoic acid. The lactone was recovered in the same way as described in Example 1.

In Table V below the yields obtained with different micro-organisms are given:

TABLE V

| Example | Micro-organism | (alpha)D | Yield (mg.) |
|---|---|---|---|
| 14 | Saccharomyces cerevisiae | +46.2 | 355 |
| 15 | Candida pseudotropicalis | +48.4 | 252 |
| 16 | Saccharomyces fragilis | +48.5 | 229 |
| 17 | Candida dattila | +45 | 280 |
| 18 | Candida pseudotropicalis var. lactosa | +54.6 | 240 |
| 19 | Candida globiformis | +55.8 | 233 |
| 20 | Cladosporium butyri | −38.5 | 147 |
| 21 | Sarcina lutea | −29.2 | 302 |
| 22 | Candida monosa | +45 | 288 |
| 23 | Margarinomyces bubaki | −31.9 | 90 |

In a series of trials similar to those of Examples 14 to 23, 4-ketododecanoic acid was reduced by the micro-organisms of Examples 14 to 20 and 21 to 23 and by *Escherichia freundi* and in a further similar series of trials 5-ketoundecanoic acid was reduced by each of these micro-organisms and by *Cladosporium butyri* and by *Penicillium notatum*, the corresponding optically active lactone being obtained in each case.

We claim:

1. A process for preparing optically active compounds which comprises microbiologically reducing an acid selected from the group consisting of 4-keto-alkanoic acids having 5–18 carbon atoms and 5-keto-alkanoic acids having 6–18 carbon atoms, by incorporating the acid in an aqueous medium containing a viable micro-organism having a reductive capacity, allowing reduction to proceed and separating the optically active reduction product from the medium.

2. A process according to claim 1 wherein the medium contains yeast extract.

3. A process according to claim 1 wherein the medium contains a fermentable sugar.

4. A process for preparing optically active compounds which comprises microbiologically reducing an acid selected from the group consisting of 4-keto-alkanoic acids having 5–18 carbon atoms and 5-keto-alkanoic acids having 6–18 carbon atoms, by incorporating the acid in an aqueous medium containing a yeast having a reductive capacity, allowing reduction to proceed and separating the optically active reduction product from the medium.

5. A process according to claim 4 wherein the yeast is selected from the group consisting of *Saccharomyces cerevisiae*, *Saccharomyces fragilis*, *Candida dattila*, *Candida globiformis*, *Candida monosa*, *Candida lactis*, *Candida pseudotropicalis* and *Candida pseudotropicalis* var. *lactosa*.

6. A process for preparing optically active compounds which comprises microbiologically reducing an acid selected from the group consisting of 4-keto-alkanoic acids having 5–18 carbon atoms and 5-keto-alkanoic acids having 6–18 carbon atoms, by incorporating the acid in an aqueous medium containing a bacteria having a reductive capacity, allowing reduction to proceed and separating the optically active reduction product from the medium.

7. A process according to claim 6 in which the bacteria is selected from the group consisting of *Sarcina lutea* and *Escherichia freundi*.

8. A process for preparing optically active compounds which comprises microbiologically reducing an acid selected from the group consisting of 4-keto-alkanoic acids having 5–18 carbon atoms and 5-keto-alkanoic acids having 6–18 carbon atoms, by incorporating the acid in an aqueous medium containing a mold having a reductive capacity, allowing reduction to proceed and separating the optically active reduction product from the medium.

9. A process according to claim 8 in which the mold is selected from the group consisting of *Cladosporium butyri*, *Penicillium notatum* and *Margarinomyces bubaki*.

10. A process for preparing optically active compounds which comprises incorporating 4-keto-dodecanoic acid in an aqueous medium containing a viable micro-organism having a reductive capacity, allowing reduction to proceed and recovering the optically active reduction product therefrom.

11. The process of claim 10 wherein yeast extract and glucose are also present in the aqueous medium.

12. A process for preparing optically active compounds which comprises incorporating 5-keto-decanoic acid in an aqueous medium containing a viable micro-organism having a reductive capacity, allowing reduction to proceed and recovering the optically active reduction product therefrom.

13. The process of claim 12 wherein yeast extract and glucose are also present in the aqueous medium.

14. A process for preparing optically active compounds which comprises incorporating 5-keto-undecanoic acid in an aqueous medium containing a viable micro-organism having a reductive capacity, allowing reduction to proceed and recovering the optically active reduction product therefrom.

15. The process of claim 14 wherein yeast extract and glucose are also present in the aqueous medium.

16. A process for preparing the dextrorotatory lactone of 4-hydroxydecanoic acid, which comprises incorporating 4-ketodecanoic acid in an aqueous medium containing fresh yeast, allowing reduction to proceed, separating the optically active hydroxy acid produced from the medium and converting this into the desired lactone by heating it under reduced pressure.

17. A process for preparing the dextrorotatory lactone of 5-hydroxydecanoic acid, which comprises incorporating 5-ketodecanoic acid in an aqueous medium containing fresh yeast, allowing reduction to proceed, separating the optically active hydroxy acid produced from the medium and converting this into the desired lactone by heating it under reduced pressure.

18. A process for preparing the dextrorotatory lactone of 5-hydroxyundecanoic acid, which comprises incorporating 5-ketoundecanoic acid in an equeous medium containing fresh yeast, allowing reduction to proceed, separating the opticaly active hydroxy acid produced from the medium and converting this into the desired lactone by heating it under reduced pressure.

19. A process for preparing the dextrorotatory lactone of 5-hydroxydodecanoic acid, which comprises incorporating 5-ketododecanoic acid in an aqueous medium containing fresh yeast, allowing reduction to proceed, separating the optically active hydroxy acid produced from the medium and converting this into the desired lactone by heating it under reduced pressure.

References Cited in the file of this patent

Karrer: "Organic Chemistry," 4th ed., Elsevier Pub. Co., Inc., New York, 1950, pp. 263–264.